US00RE48609E

(19) United States
(12) Reissued Patent
Wu et al.

(10) Patent Number: US RE48,609 E
(45) Date of Reissued Patent: Jun. 29, 2021

(54) THREE-DIMENSIONAL PRINTING APPARATUS

(71) Applicant: Young Optics Inc., Hsinchu (TW)

(72) Inventors: Li-Han Wu, Hsinchu (TW); Hsin-Han Hsu, Hsinchu (TW)

(73) Assignee: Young Optics Inc., Hsinchu (TW)

(21) Appl. No.: 15/468,119

(22) Filed: Mar. 24, 2017

Related U.S. Patent Documents

Reissue of:
(64) Patent No.: 8,985,989
Issued: Mar. 24, 2015
Appl. No.: 13/663,484
Filed: Oct. 30, 2012

(30) Foreign Application Priority Data

May 3, 2012 (TW) ..... 101115784

(51) Int. Cl.
*B29C 64/112* (2017.01)
*B33Y 30/00* (2015.01)

(52) U.S. Cl.
CPC ..... *B29C 64/112* (2017.08); *B33Y 30/00* (2014.12)

(58) Field of Classification Search
None
See application file for complete search history.

(56) References Cited

U.S. PATENT DOCUMENTS 4,585,933 A * 4/1986 Ando ..... 250/201.5
4,915,489 A * 4/1990 Minko ..... 359/834
5,980,813 A 11/1999 Narang et al.
6,500,378 B1 * 12/2002 Smith ..... 264/401
6,566,664 B2 * 5/2003 Muraki ..... 250/492.2
6,870,310 B2 * 3/2005 Okunuki et al. ..... 313/446
6,894,292 B2 * 5/2005 Gil ..... G03F 7/70275 250/492.2
7,931,851 B2 * 4/2011 Ueno ..... 264/401
8,783,904 B2 * 7/2014 Vissenberg et al. ..... 362/244
2001/0048184 A1 * 12/2001 Ueno ..... 264/401
(Continued)

FOREIGN PATENT DOCUMENTS

JP 2004223774 8/2004
JP 2009166447 7/2009
(Continued)

OTHER PUBLICATIONS

"Office Action of Japan Counterpart Application", issued on Jul. 15, 2014, p. 1-2.

(Continued)

*Primary Examiner* — Elizabeth L McKane
(74) *Attorney, Agent, or Firm* — JCIPRNET

(57) ABSTRACT

A three-dimensional printing apparatus is provided, including a container, a display, a control unit and an optical film. The container contains a photosensitive material. The display has a plurality of display units. Each of the display units is capable of emitting a light beam. The control unit is capable of controlling the display units. The optical film is capable of projecting the light beams emitted from the display units onto the photosensitive material, forming a plurality of projected patterns. An arranging sequence and an arranging direction of the projected patterns are substantially the same as an arranging sequence and an arranging direction of the display units.

19 Claims, 8 Drawing Sheets

(56) References Cited

U.S. PATENT DOCUMENTS

| | | | | |
|---|---|---|---|---|
| 2003/0173714 | A1* | 9/2003 | Ueno | 264/401 |
| 2007/0029706 | A1* | 2/2007 | Ueno | 264/401 |
| 2010/0157030 | A1* | 6/2010 | Nayar et al. | 348/54 |
| 2010/0262272 | A1 | 10/2010 | Shkolnik et al. | B33Y 30/00 700/120 |
| 2010/0265465 | A1* | 10/2010 | Kubara et al. | 353/7 |
| 2011/0001272 | A1* | 1/2011 | Honda et al. | 264/401 |
| 2011/0116049 | A1* | 5/2011 | Nayar et al. | 353/7 |
| 2012/0057143 | A1* | 3/2012 | Jamar | G03F 7/70391 355/67 |
| 2012/0146897 | A1* | 6/2012 | Yoshida et al. | 345/156 |
| 2013/0140741 | A1* | 6/2013 | El-Siblani et al. | 264/401 |
| 2013/0168902 | A1* | 7/2013 | Herzog et al. | 264/401 |

FOREIGN PATENT DOCUMENTS

| | | | | |
|---|---|---|---|---|
| JP | 2011508690 | | 3/2011 | |
| TW | M389021 | | 9/2010 | |
| TW | M420727 | | 1/2012 | |
| WO | WO2011/024453 | A1 * | 3/2001 | G02B 27/22 |
| WO | WO2005/025838 | A1 * | 3/2005 | B29C 67/00 |
| WO | WO-2010101465 | A1 * | 9/2010 | G03F 7/70391 |
| WO | WO2010/150149 | A2 * | 12/2010 | H05B 33/08 |
| WO | 2012028747 | | 3/2012 | |

OTHER PUBLICATIONS

"Office Action of Taiwan Counterpart Application", issued on Mar. 5, 2014, p. 1-6.

* cited by examiner

THREE-DIMENSIONAL PRINTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a Reissue Application of U.S. Pat. No. 8,985,989 issued on Mar. 24, 2015, application Ser. No. 13/663,484, filed on Oct. 30, 2012, which* claims the priority benefit of Taiwan application serial no. 101115784, filed on May 3, 2012. The entirety of *each of* the above-mentioned patent [application] *applications* is hereby incorporated by reference herein and made a part of this specification.

BACKGROUND OF THE INVENTION

1. Field of the Invention

The invention relates to a printing apparatus, more particularly, to a three-dimensional printing apparatus.

2. Description of Related Art

Rapid Prototyping (RP) is a new prototype manufacturing technology developed in the mid-80s. Rapid Prototyping has combined technologies such as mechanical engineering, Computer-aided design (CAD), digital control technology, laser technology and material science, allowing the design concept to be automatically, directly, quickly and accurately transformed into a prototype with certain functionalities or manufacturing parts, as a result, assessment, modification and functionalities test to the design concept can be quickly performed, thereby remarkably reducing the developing and manufacturing process of the product. With advantages like agility, adaptable for all sorts of forms, high flexibility and high integration, it is widely applied in different technical fields such as mechanical, motor vehicle, electronic, communication and aerospace technology. During an initial stage of the development, a CAD file of required drawings is designed, an original model is manufactured before the actual production, and used for design confirmation, product modification, functionality test and molding process, such model is known as the prototype.

Different prototyping materials are used according to different prototyping technologies, in which their prototyping principle and system features are also different from each other. For example, stereo lithography apparatus (SLA) is the first commercialized system with biggest share of market. The processing principle thereof is consisted of the following steps: scanning the liquid photosensitive polymer by using HeCd laser or Argon laser; thereby generating a polymerized cured thin-film; next, bringing the lifting table down and then up again; applying another layer of polymer resin on the surface of the desired processing area; scraping off the liquid surface with a scraper until the surface is horizontal; scanning the surface with laser so the processing area is closely combined with the upper layer thereof; repeating above steps until the desired three-dimensional work piece is generated. In addition, the image-forming system using SLA technology is either the laser scanning system or the light projector, since the hardware of the system is complex and large in size, and the image-forming distance for the laser scanning system or the projector needs to be included in the machine, the overall size of the such system cannot be miniaturized.

Regarding related art of the prototyping technology, U.S. Pat. No. 5,980,813 has disclosed a rapid prototyping method using multilayer materials. US Patent Publication No. 20100262272 has also disclosed an apparatus of manufacturing three-dimensional object by using curable materials.

SUMMARY OF THE INVENTION

A three-dimensional printing apparatus is provided, and the three-dimensional printing apparatus has structure to help reducing overall size of the three-dimensional printing apparatus.

Other objects and advantages of the invention can be further illustrated by the technical features broadly embodied and described as follows.

A three-dimensional printing apparatus is provided according to an embodiment of the invention. The three-dimensional printing apparatus includes a container, a display, a control unit and an optical film. The container contains a photosensitive material. The display has a plurality of display units, and each of the display units is capable of emitting a light beam. The control unit is connected to the display, for controlling the display units. The optical film is disposed between the display and the container, for projecting the light beams emitted from the display units onto the photosensitive material, so as to form a plurality of projected patterns. An arranging sequence and an arranging direction of the projected patterns are substantially the same as an arranging sequence and an arranging direction of the display units.

In an embodiment of the invention, the container has a bottom, disposed between the display and the photosensitive material, and the bottom is a light-transparent bottom, the bottom of the container has an upper surface facing the photosensitive material.

In an embodiment of the invention, a distance between the display and the upper surface of the container is less than or equal to 3 cm.

In an embodiment of the invention, the three-dimensional printing apparatus further comprises a work platform, dipped into the photosensitive material, capable of moving relatively with the container. The work platform has a work surface, wherein the work platform is controlled by the control unit, the control unit commands the display to display a first image during a first time and locates the work surface to a first location. The light beams emitted from the display units corresponding to the first image are projected onto a first layer of the photosensitive material between the work surface and the upper surface through the optical film, so as to cure the first layer of the photosensitive material to form a first cured layer. And the control unit commands the display to display a second image during a second time and locates the work surface to the second location. The light beams emitted from the display units corresponding to the second image are projected to a second layer of the photosensitive material between the first cured layer and the upper surface through the optical film, so as to cure the second layer of the photosensitive material to form a second cured layer.

In an embodiment of the invention, the work surface faces the bottom. The second cured layer is located between the first cured layer and the bottom, and the first location is located between the bottom and the second location.

In an embodiment of the invention, the optical film comprises a plurality of optical structures, and each of the optical structures is aligned with at least one of the display units.

In an embodiment of the invention, each of the optical structures is a lens, and each of the lenses is aligned with one of the display units.

In an embodiment of the invention, each of the optical structures is a cylindrical lens, and each of the cylindrical lenses is aligned with a row of the display units.

In an embodiment of the invention, an image of the display units is projected on the photosensitive material to form the projected patterns by the optical structures.

In an embodiment of the invention, each of the display units comprises at least a pixel. A size of each of the optical structures is an integer times a size of the pixel of the corresponding display unit.

In an embodiment of the invention, the optical film comprises a plurality of optical structures, and each of the display units is aligned with some of the optical structures. A size of each of the display units is an integer times a size of the corresponding optical structure.

In an embodiment of the invention, the optical film comprises a plurality of optical structures, and each of the optical structures is a pyramidal prism or a triangular-shaped prism.

In an embodiment of the invention, the optical film is a Fresnel lens, diffusing film or a privacy filter.

In an embodiment of the invention, the light beams emitted from the display units are visible light.

In an embodiment of the invention, the optical film may be a single layer film or a multilayer film.

Based on above, the three-dimensional printing apparatus according to the embodiment of the invention projects the display units of the display onto the photosensitive material through the optical film, and the arranging sequence and the arranging direction of the projected patterns are substantially the same as the arranging sequence and arranging direction of the display units. As a result, a distance between the display and the photosensitive material may be reduced, thereby reducing a size of the three-dimensional printing apparatus, and providing good effect of three-dimensional printing.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
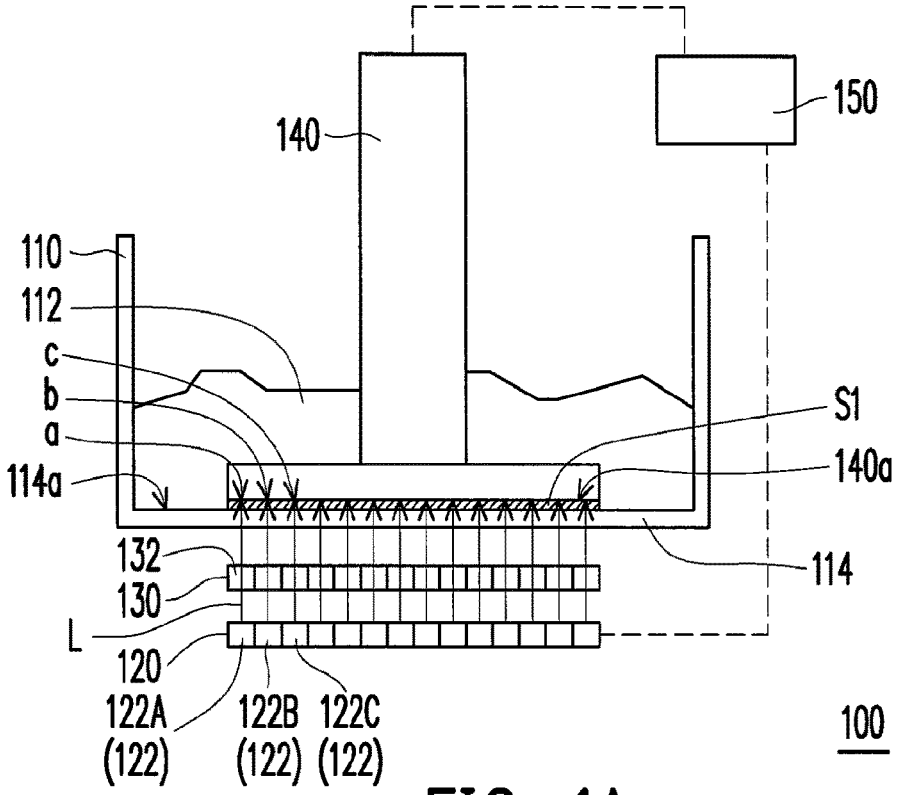
FIG. 1A, FIG. 1B and FIG. 1C are schematic views of operations in a three-dimensional printing apparatus according an embodiment of the invention.
Figure 1B:
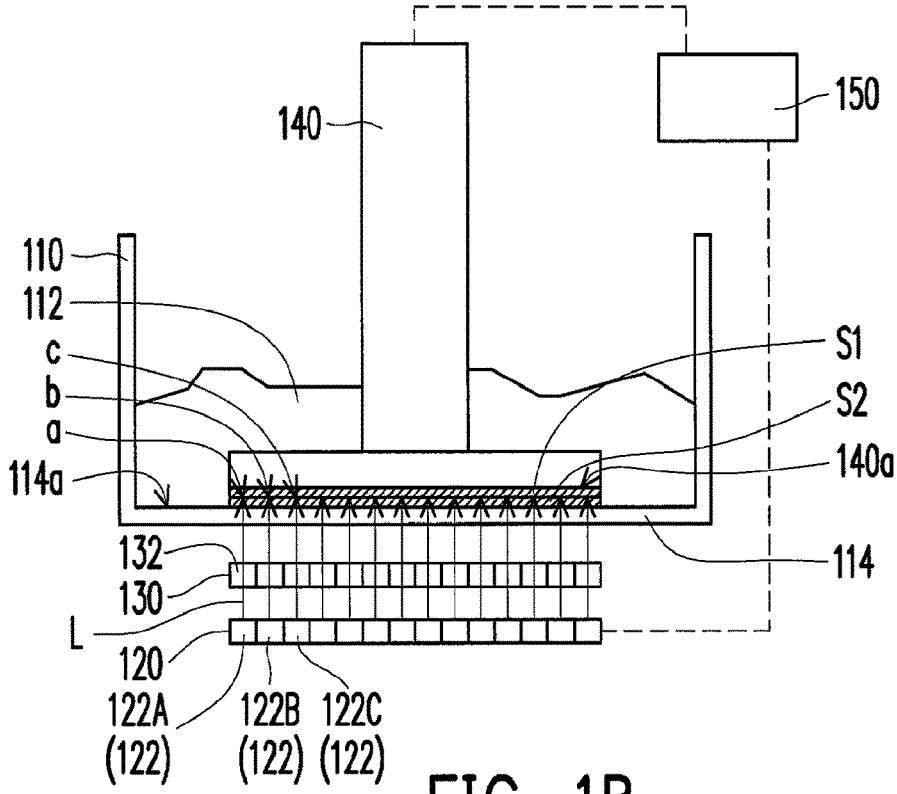
Figure 1C:
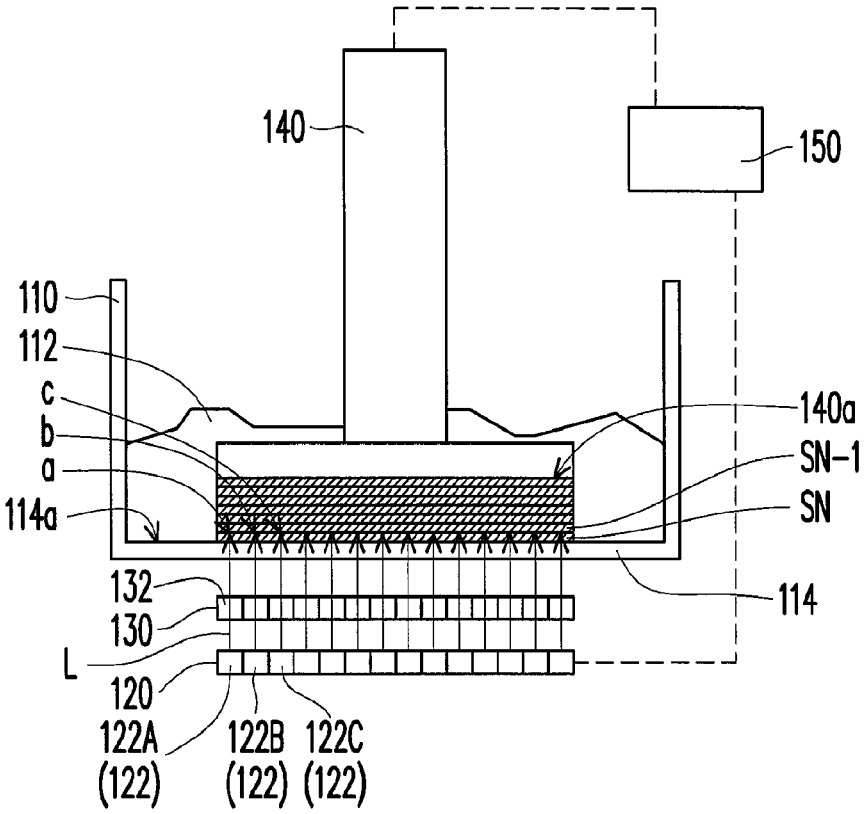

FIG. 1A, FIG. 1B and FIG. 1C are schematic views of operations in the three-dimensional printing apparatus according an embodiment of the invention. A three-dimensional printing apparatus 100 includes a container 110, a display 120 and an optical film 130. The container 110 contains a photosensitive material 112, and the photosensitive material 112 may be a fluid material or a semi-fluid material. The display 120 has a plurality of display units 122, and each of the display units 122 is capable of emitting a light beam L. The optical film 130 is capable of projecting the light beams L emitted from the display units 122 onto the photosensitive material 112, forming a plurality of projected patterns on the photosensitive material 112. The optical film 130 may be a single layer film or a stacked multilayer film.

Specifically, in the present embodiment, the display 120 is disposed under a bottom 114 of the container 110, and the optical film 130 is disposed between the display 120 and the bottom 114 of the container 110. In addition, since the bottom 114 of the container 110 is a light-transparent bottom, after the light beams L emitted from the display units 122 pass through the optical film 130, the light beams L may go through the bottom 114 and project the projected patterns on the photosensitive material 112, thereby causing a chemical reaction (such as curing or hardening) with the photosensitive material 112. An arranging sequence and an arranging direction of the projected patterns on the photosensitive material 112 are substantially the same as an arranging sequence and an arranging direction of the display units 122 on the display 120. For example, referring to FIG. 1A, the display units 122A, 122B and 122C respectively project the projected patterns to a plurality of locations a, b and c on the photosensitive material 112. The arranging sequence and the arranging direction of the locations a, b and c of the projected patterns on the photosensitive material 112 are substantially the same as the arranging sequence and arranging direction of the display units 122A, 122B and 122C on the display 120. That is, the display units 122A, 122B and 122C are arranged from left to right, and the locations a, b and c respectively correspond to the display units 122A, 122B and 122C and are also arranged from left to right. Similarly, viewing along a direction perpendicular to the paper plane of FIG. 1A, the arranging sequence and the arranging direction of the projected patterns on the photosensitive material 112 are the same as the arranging sequence and the arranging direction of the display units 122 on the display 120, for example, both are arranged in the direction toward the paper plane of FIG. 1A. In the embodiment, the locations of the display units 122 on the display 120 correspond to the projected patterns on the photosensitive material 112 in a one-to-one manner. As a result, an image displayed by the entire display units 122 may be formed correspondingly on the photosensitive material 112. *Referring again to FIG. 1A to FIG. 1C, in some embodiments, an optical assembly configured for the three-dimensional printing apparatus 100 can be formed by including the container 110 and the display 120 therein.*

It is noted that, in the three-dimensional printing apparatus 100 of the embodiment, the image displayed on the display 120 is divided into multiple display units 122 for displaying, and the light beams L of the display units 122 corresponding to the image are projected onto the photosensitive material 112 to form the projected patterns through the optical film 130 in the one-to-one manner. The arranging sequence and the arranging direction of the projected patterns on the photosensitive material 112 are substantially the same as the arranging sequence and the arranging direction of the display units 122 on the display 120. *In the present embodiment, a projection system configured for the three-dimensional printing apparatus 100 can be formed by including the container 110 and the display 120 comprising the display units 122 therein.* Comparatively, a conventional three-dimensional device with the projection lens projects the image of the display 120 by using whole surface image-forming method via the projection lens, forming the image on the photosensitive material 112. Based on the image-forming principle, the image formed on the photosensitive material 112 is a 180 degree reversed image. Therefore, design of an image-forming distance is necessary in order to meet the image-forming requirement, thereby increasing the size of the printing device.

In the embodiment, the image displayed on the display 120 is divided into multiple display units 122, and the light beams L of the display units 122 of the display 120 corresponding to the image are projected on the photosensitive material 112 to form the projected patterns through the optical film 130 in the one-to-one manner. Since a size of each display unit 122 is smaller than the entire image, the projecting distance between the display units 122 and the photosensitive material 112 may be reduced. As a result, a required distance between the display 120 and the photosensitive material 112 may be reduced, and the size of the three-dimensional printing apparatus 100 may also be reduced. For example, in the embodiment, a distance between the display 120 and an upper surface 114a of the bottom 114 of the container 110 is less than or equal to 3 cm. On the other hand, the display 120 of the embodiment may be a liquid crystal display. Therefore, a light source of the display 120 provided for projecting may be a visible light. However, an invisible light (such as UV light) source for curing or hardening the photosensitive material 112 may also be used.

Referring to FIG. 1A, in particularly, the three-dimensional apparatus 100 further includes a work platform 140 and a control unit 150. The work platform 140 is dipped into the photosensitive material 112 and capable of moving with respect to the container 110, wherein the work platform 140 has a work surface 140a facing the bottom 114 of the container 110. The control unit 150 is coupled with the work platform 140 and the display 120, for controlling the work platform 140 and the display unit 122. In the embodiment, the work platform 140 is capable of relatively moving from top to bottom of the container 110 or from bottom to top of the container 110.

Next, referring to FIG. 1A, FIG. 1B, and FIG. 1C in sequence. In FIG. 1A, the control unit 150 commands the display 120 to display a first image during a first time, and the first image is divided into a plurality of corresponding display units 122, and the work surface 140a is located at a first location (the location as shown in FIG. 1A). Here, the light beams L emitted from the display units 122 corresponding to the first image are projected to a layer of the photosensitive material 112 between the work surface 140a of the work platform 140 and the upper surface 114a of the bottom 114 through the optical film 130, such that a first cured layer S1 is formed by curing the layer of the photosensitive material 112 between the work surface 140a and the upper surface 114a and corresponds to the first image. Next, in FIG. 1B, the work surface 140a moves to be located at a second location (the location as shown in FIG. 1B) by the control unit 150 during a second time. Here, the photosensitive material 112 in the container 110 is filled between the first cured layer S1 and the upper surface 114a, the control unit 150 commands the display 120 to display a second image, and the second image is divided into a plurality of corresponding display units 122. The light beams L emitted from the display units 122 corresponding to the second image are projected to a layer of the photosensitive material 112 between the first cured layer S1 and the upper surface 114a through the optical film 130, such that a second cured layer S2 is formed by curing the layer of the photosensitive material 112 between the first cured layer S1 and the upper surface 114a and corresponds to the second image. Subsequently, in FIG. 1C, the work surface 140a moves to be located at a $N^{th}$ location (the location as shown in FIG. 1C) by the control unit 150. The control unit 150 commands the display 120 to display an $N^{th}$ image during an $N^{th}$ time, the $N^{th}$ image is divided into a plurality of corresponding display units 122. The light beams L corresponding to the $N^{th}$ image are projected to a layer of the photosensitive material 112 between an $N-1^{th}$ cured layer SN−1 and the upper surface 114a through the optical film 130, so that an $N^{th}$ cured layer SN is formed by curing the layer of the photosensitive material 112 between an $N-1^{th}$ cured layer SN−1 and the upper surface 114a and corresponds to the $N^{th}$ image. In the embodiment, N, for example, is a positive integer larger than or equal to 3.

Regarding the embodiment, the work surface 140a faces the upper surface 114a of the bottom 114, the second cured layer S2 is located between the first cured layer S1 and the upper surface 114a of the bottom 114, and the first location is located between the bottom 114 and the second location. More specifically, a slicing process may be performed on the three-dimensional object, so as to divide an object into multilayer image data. The control unit 150 commands the corresponding display units 122 to display the first layer image of the object during the first time. Next, the corresponding display units 122 are commanded to display the second layer image of the object during the second time. After repeating said process for a number of times, the images of different layers are sequentially projected to the corresponding layers of photo sensitive material 112 through the optical film 130, so that the corresponding layers of the photosensitive material 112 are cured in respond to each different layer of images, such that a three-dimensional object is formed in a layer-by-layer manner.

In the embodiment, the display 120 is disposed under the bottom 114 of the container 110, so that the light beams L of the display units 122 may be emitted from bottom to top onto the photosensitive material 112 above the upper surface 114a of the bottom 114. However, the invention is not limited thereto. In other embodiments, the display 120 may also be disposed on a top of the container 110 (not illustrated), so that the light beams L of the display units 122 may be emitted from top to bottom onto the photosensitive material 112.

Figure 2:
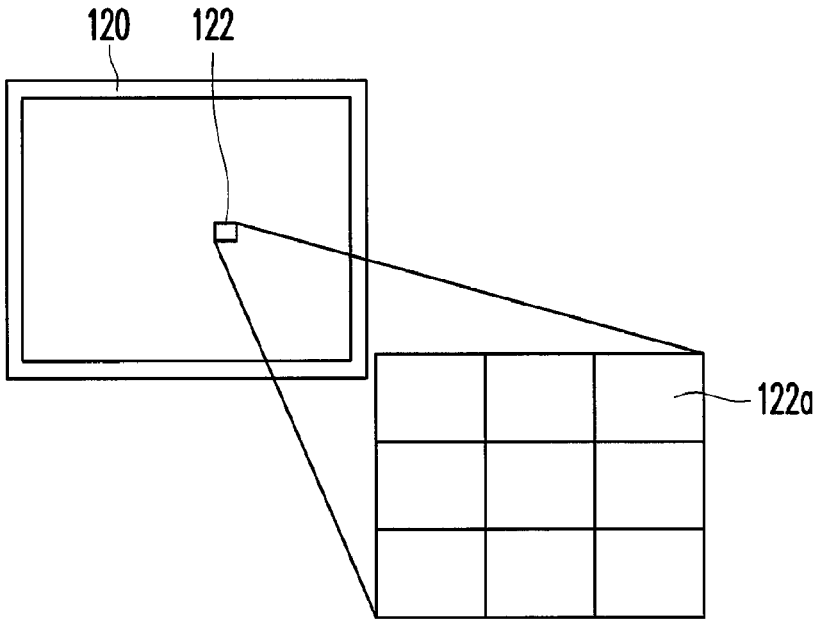
FIG. 2 is a schematic view of a plurality of display units of a display.

FIG. 2 is a schematic view of the plurality of display units of the display. Referring to FIG. 2, in the three-dimensional printing apparatus 100, the display 120 may be a liquid crystal display panel, and the display unit 122 may include at least one pixel 122a in the liquid crystal display panel. For example, in FIG. 2, the display units 122 are composed by nine pixels 122a. The number of the pixels 122a included in the display units 122 may be adjusted according to the required resolution of the image. On the other hand, the conventional three-dimensional technology usually uses a display with color filter. The three-dimensional printing apparatus 100 according to an embodiment of the invention may use a display 120 without color filter, each of the sub-pixels corresponding to filters of different color in the original display may now be referred to as one single pixel, such that the resolution of the display 120 may be improved, thereby allowing the three-dimensional printing technology in providing a higher resolution.

In the embodiment, the optical film 130 includes a plurality of optical structures 132, for projecting the light beams L emitted from the display unit 122 onto the photosensitive material 112. Several preferable embodiments are provided below to further illustrate the relative relation between the display unit 122 and the optical film 130.

Figure 3A:
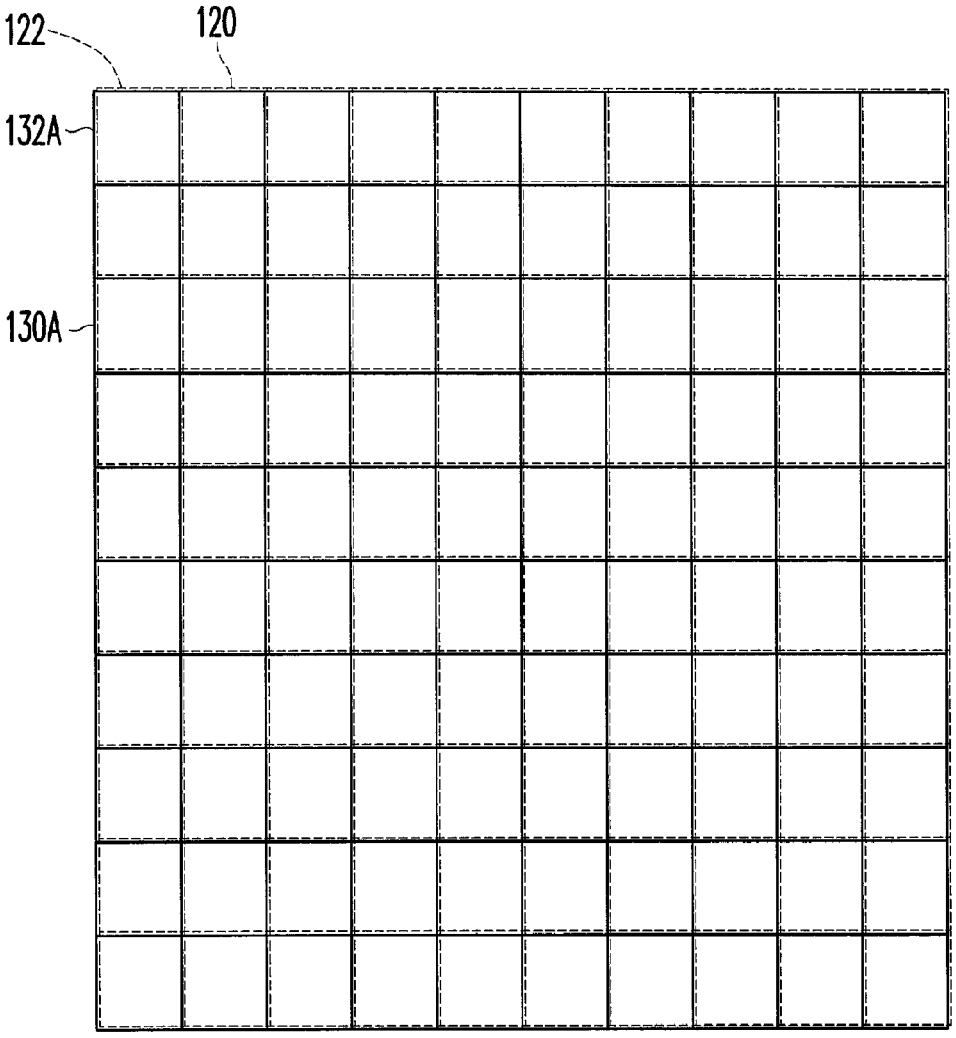
FIG. 3A illustrates a corresponding relationship between the display units of the display and a plurality of optical structures of an optical film in a first embodiment of the invention.
Figure 3B:
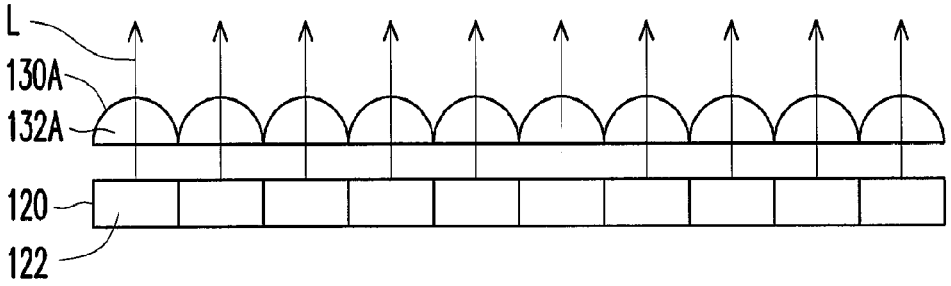
FIG. 3B is a side view of FIG. 3A.

FIG. 3A illustrates a corresponding relationship between the display units of the display and the optical structures of the optical film in a first embodiment of the invention. FIG. 3A is a top view illustrating the overlapping of the display 120 and an optical film 130A, wherein the portion with dotted line surrounded represents the display 120, and the portion with full line surrounded represents the optical film 130A. FIG. 3B is a side view of FIG. 3A.

Referring to FIG. 3A and FIG. 3B together. In the embodiment, the optical film 130A has a plurality of optical structures 132A, wherein each optical structure 132A is a lens (such as lens having bent surface on both two directions that are perpendicular to each other), a size of each optical structure 132A is substantially equal to the size of each display unit 122.

Figure 4A:
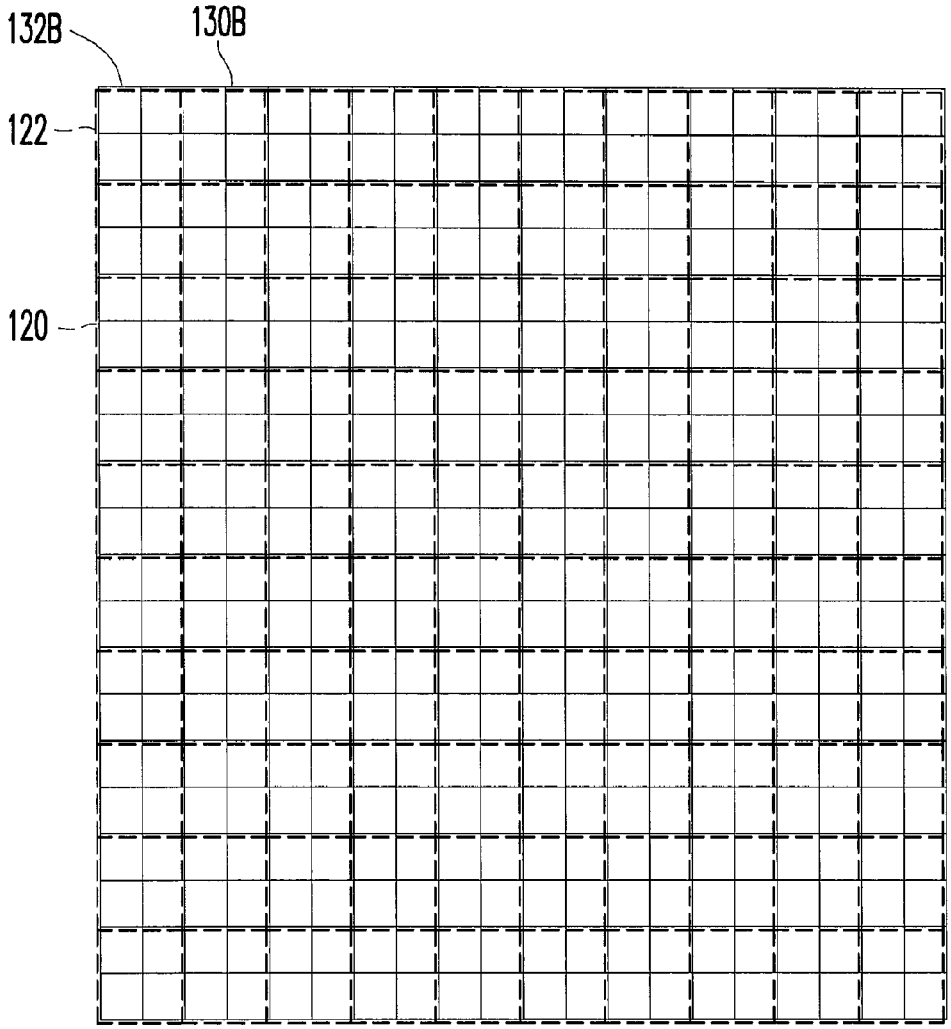
FIG. 4A illustrates a corresponding relationship between the display units of the display and the optical film in a second embodiment of the invention.
Figure 4B:
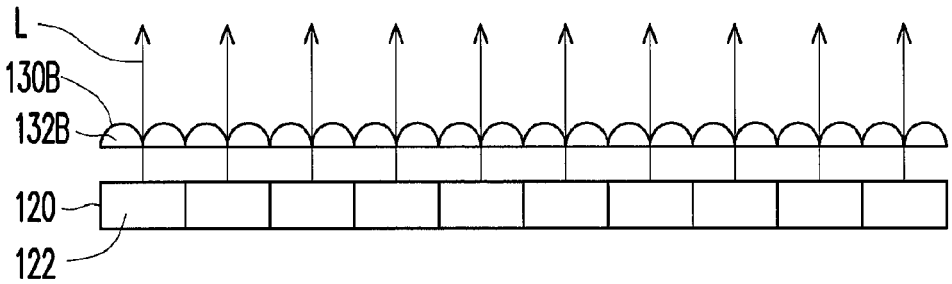
FIG. 4B is a side view of FIG. 4A.

FIG. 4A illustrates a corresponding relationship between the display units of the display and the optical structures of the optical film in a second embodiment of the invention. FIG. 4B is a side view of FIG. 4A. Each optical structure 132B of the optical film 130B of the embodiment is similar to the optical structure 132A shown in the FIG. 3A, namely, the lens. However, a size of each optical structure 132B is substantially smaller than the size of the display unit 122.

Figure 5A:
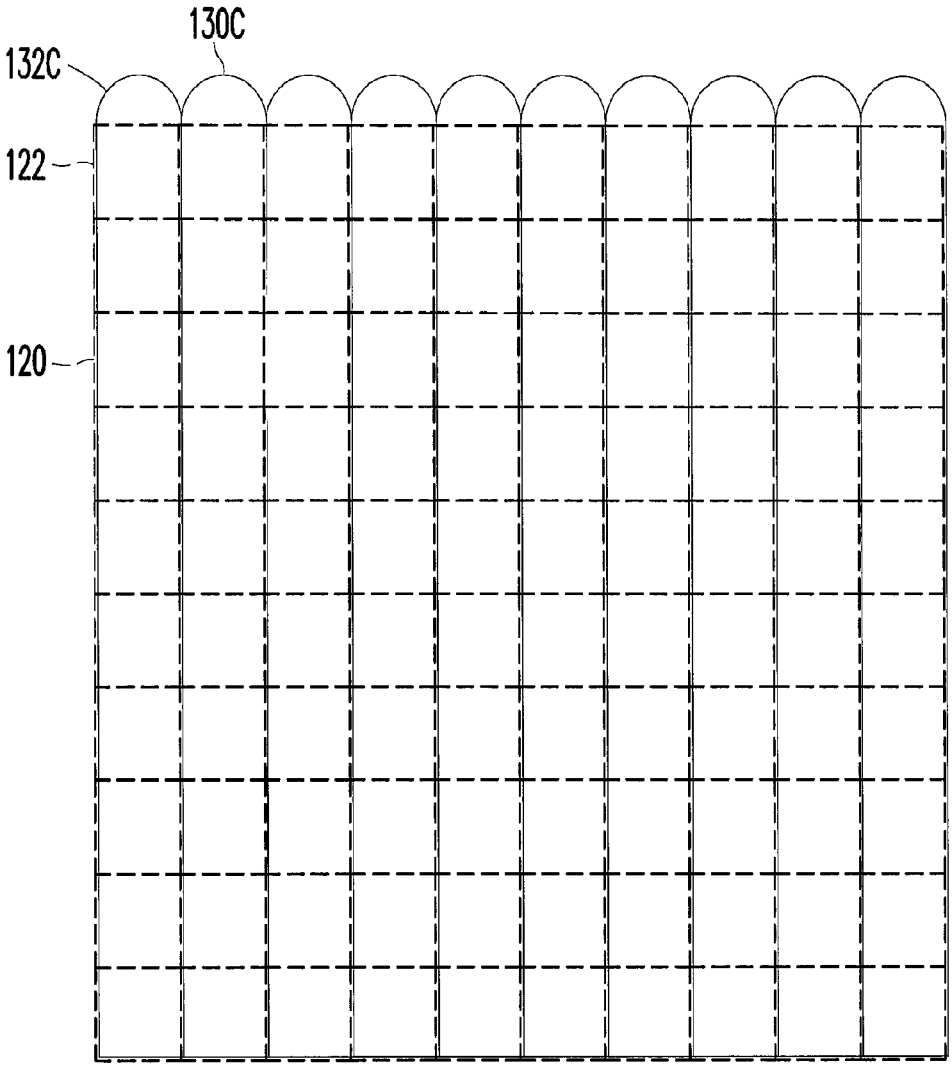
FIG. 5A illustrates a corresponding relationship between the display units of the display and the optical structures of the optical film in a third embodiment of the invention.
Figure 5B:
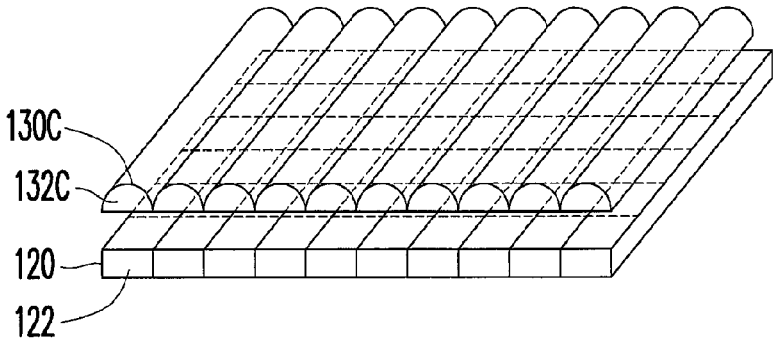
FIG. 5B is a side view of FIG. 5A.

FIG. 5A illustrates a corresponding relationship between the display units of the display and the optical structures of the optical film in a third embodiment of the invention. FIG. 5B is a side view of FIG. 5A. In the embodiment, each optical structure 132C on the optical film 130C is a cylindrical lens, and a width of each optical structure 132C is substantially equal to the width of the display unit 122.

According to the embodiments in FIG. 3A, FIG. 4A and FIG. 5A, an image of the display units 122 is formed on the photosensitive material 112 through the lens or the cylindrical lens. Therefore, each of the optical structures 132A, 132B and 132C may be adjusted, for aligning with at least one display unit 122. For example, in FIG. 3A, each lens (the optical structure 132A) is aligned with one corresponding display unit 122. In another embodiment, each of the display unit 122 is aligned with a plurality of optical structures. For example, in FIG. 4A, each of the display units 122 is align with four lenses (the optical structures 132B). When one display unit 122 includes a plurality of pixels 122a (referring to FIG. 2), each lens is aligned with the plurality of pixels 122a, and when one display unit 122 includes one pixel 122a, each lens is aligned with one pixel 122a. In other words, in FIG. 3A, the size of each optical structure 132A may be an integral times the size of the pixel 122a of the corresponding display unit 122 (referring to FIG. 2). Whereas in FIG. 4A, the size of each display unit 122 is an integral times the size of the corresponding optical structure 132B. In FIG. 5A, each cylindrical lens (the optical structure 132C) is aligned with a row of display units 122. Since the size of each display unit 122 is smaller than the size of the entire image displayed by the display 120, the image-forming distance for projecting the image of the display units 122 respectively onto the photosensitive material 112 by using the optical structures 132 (such as the plurality of lenses or cylindrical lenses) may be smaller than the image-forming distance for projecting the entire image onto the photosensitive material 112 by using whole surface image-forming method. Therefore, the overall size of the three-dimensional printing apparatus 100 may be effectively reduced.

Figure 6A:
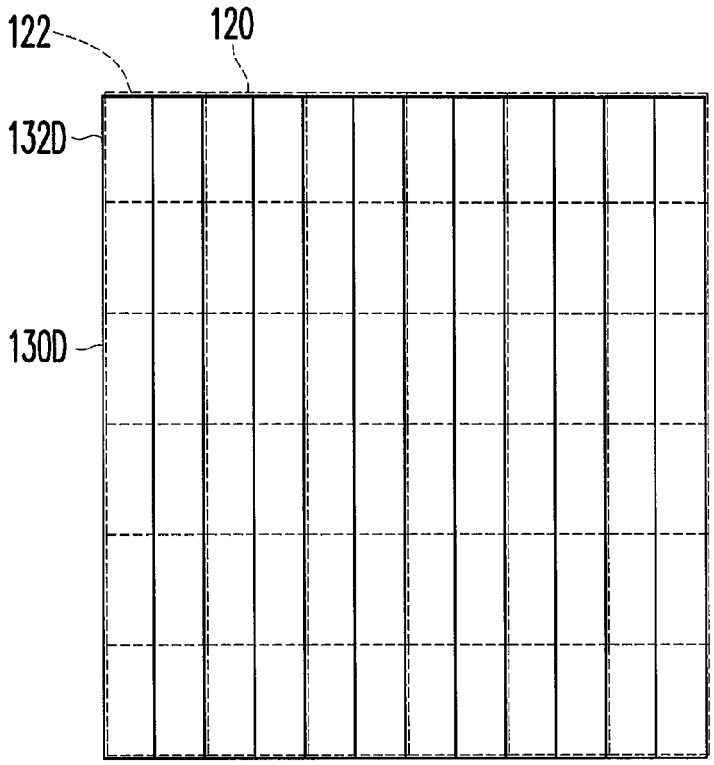
FIG. 6A illustrates a corresponding relationship between the display units of the display and the optical structures of the optical film in a fourth embodiment of the invention.
Figure 6B:
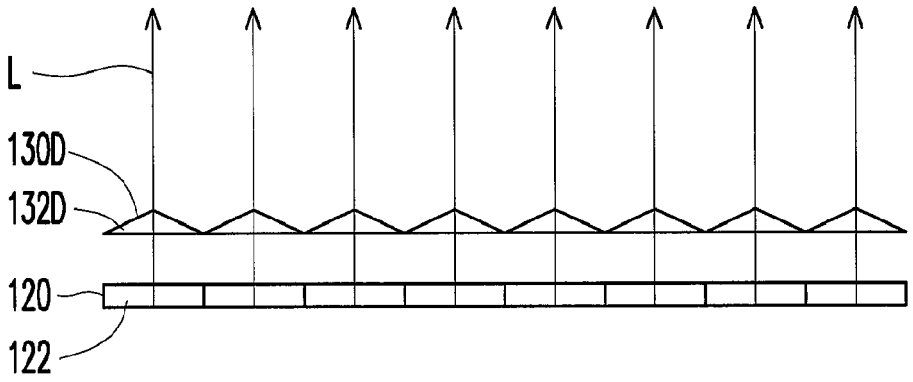
FIG. 6B is a side view of FIG. 6A.

FIG. 6A illustrates a corresponding relationship between the display units of the display and the optical structures of the optical film in a fourth embodiment of the invention. FIG. 6B is a side view of FIG. 6A. In the embodiment, each optical structure 132D of the optical film 130D is a triangular-shaped prism, and a width of each optical structure 132D is substantially equal to the width of the display unit 122.

Figure 7A:
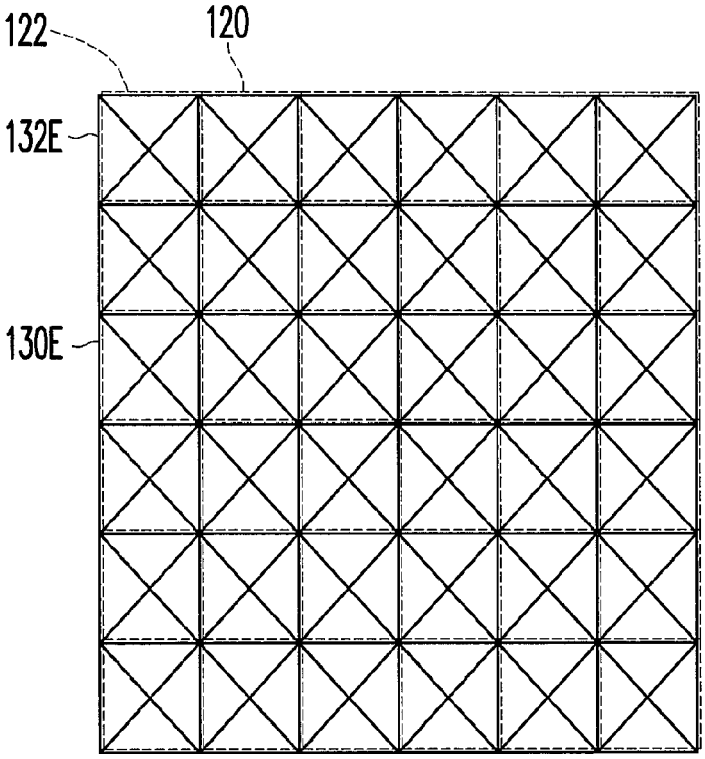
FIG. 7A illustrates a corresponding relationship between the display units of the display and the optical structures of the optical film in a fifth embodiment of the invention.
Figure 7B:
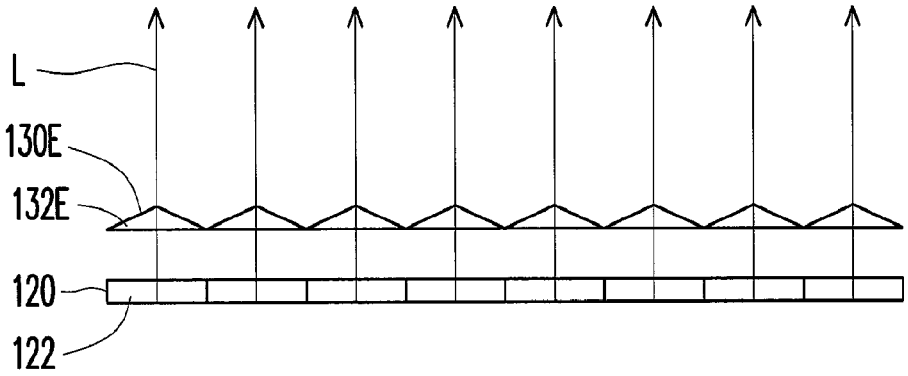
FIG. 7B is a side view of FIG. 7A.

FIG. 7A illustrates a corresponding relationship between the display units of the display and the optical structures of the optical film in a fifth embodiment of the invention. FIG. 7B is a side view of FIG. 7A. In the embodiment, each optical structure 132E of the optical film 130E is a pyramidal prism, and a size of each optical structure 132E is equal to the size of each display unit 122.

However, in other embodiments, the size of the triangular-shaped prism or the pyramidal prism may not be an integer times the display unit 122, and the location of the triangular-shaped prism or the pyramidal prism may not have corresponding relationship with the location of the display unit 122, both are also possible.

Figure 8:
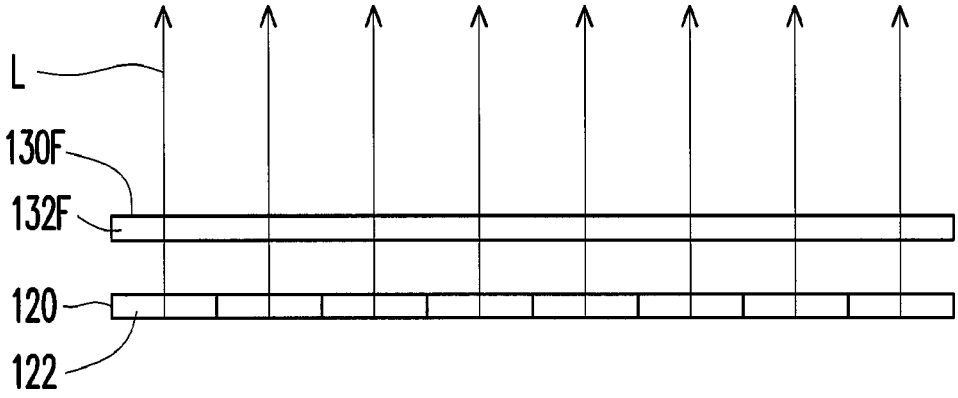
FIG. 8 illustrates a corresponding relationship between the display units of the display and the optical structures of the optical film in a sixth embodiment of the invention.

FIG. 8 illustrates a corresponding relationship between the display units of the display and the optical structures of the optical film in a sixth embodiment of the invention. In the embodiment, the optical film 130F is a diffusing film, and optical structures 132F of the optical film 130F are provided for converging the light beams L, whereas in the other embodiments, the optical film 130F may also be a Fresnel lens or a privacy filter.

In the embodiments of FIG. 6A and FIG. 7A, the method for projecting the display units 122 on the photosensitive material 112 is tended to use a projection method. Therefore, the locations of each triangular-shaped prism (the optical structure 132D) and each pyramidal prism (the optical structure 132E) may not have corresponding relationship with the locations of the display units 122. However, the light beams L emitted from the corresponding display units 122 may be converged onto the photosensitive material 112 (as shown in FIG. 1A, FIG. 1B and FIG. 1C). Similarly, the optical film 130F (such as a Fresnel lens or a privacy filter) shown in FIG. 8 is also capable of converging the light beams L emitted from the display units 122. In addition, when the light beams L emitted from the display 120 are converged more, the light beams L of the display units 122 may still be projected on the photosensitive material 122 (as shown in FIG. 1A, FIG. 1B and FIG. 1C) when the optical film 130F is the diffusing film.

Based on above, the three-dimensional printing apparatus according to the embodiment of the invention projects the display units of the display onto the photosensitive material through the optical film, and the arranging sequence and the arranging direction of the projected patterns are substantially the same as the arranging sequence and arranging direction of the display units. As a result, the distance between the display and the photosensitive material may be reduced, thereby reducing the size of the three-dimensional printing apparatus, and providing good effect of three-dimensional printing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. In addition, the terms such as "first", "second" as recited in the specification or the claims are used to give the elements names or distinguish different embodiments or scopes, but not to limit the maximum number or the minimum number of the elements.

What is claimed is:

[1. A three-dimensional printing apparatus, comprising:

a container, containing a photosensitive material;

a display, having a plurality of display units, each of the display units being capable of emitting a light beam;

a control unit, connected to the display and controlling the display units of the display; and an optical film, disposed between the display and the container, the optical film comprising a plurality of optical structures folined thereon and arranged in a direction perpendicular to a transmission direction of the light beams, and the optical structures respectively projecting the light beams emitted from the corresponding display units onto the photosensitive material to a plurality of projected patterns, wherein an arranging sequence and an arranging direction of the projected patterns are substantially the same as an arranging sequence and an arranging direction of the display units, and a dimension of each of the projected patterns is substantially equal to a dimension of each of the display units, so that the projected patterns are formed as not overlapping, and a distance between the display and the upper surface of the container is less than or equal to 3 cm.]

[2. The three-dimensional printing apparatus of claim 1, wherein the container has a bottom, disposed between the display and the photosensitive material, and the bottom is a light-transparent bottom, the bottom of the container has an upper surface facing the photosensitive material.]

[3. The three-dimensional printing apparatus of claim 2, wherein a distance between the display and the upper surface of the container is less than or equal to 3 cm.]

[4. The three-dimensional printing apparatus of claim 2, further comprising:

a work platform, dipped into the photosensitive material, capable of moving relatively with the container, wherein the work platform has a work surface;

wherein the work platform is controlled by the control unit, the control unit commands the display to display a first image during a first time and locates the work surface to a first location, the light beams emitted from the display units corresponding to the first image are projected onto a first layer of the photosensitive material between the work surface and the upper surface through the optical film, so as to cure the first layer of the photosensitive material to form a first cured layer, and the control unit commands the display to display a second image during a second time and locates the work surface to the second location, the light beams emitted from the display units corresponding to the second image are projected to a second layer of the photosensitive material between the first cured layer and the upper surface through the optical film, so as to cure the second layer of the photosensitive material to form a second cured layer.]

[5. The three-dimensional printing apparatus of claim 4, wherein the work surface faces the bottom, the second cured layer is located between the first cured layer and the bottom, and the first location is located between the bottom and the second location.]

[6. The three-dimensional printing apparatus of claim 1, wherein each of the optical structures is aligned with at least one of the display units.]

[7. The three-dimensional printing apparatus of claim 6, wherein each of the optical structures is a lens, and each of the lenses is aligned with one of the display units.]

[8. The three-dimensional printing apparatus of claim 6, wherein each of the optical structures is a cylindrical lens, and each of the cylindrical lenses is aligned with a row of the display units.]

[9. The three-dimensional printing apparatus of claim 6, wherein an image of the display units is projected on the photosensitive material to form the projected patterns by the optical structures.]

[10. The three-dimensional printing apparatus of claim 6, wherein each of the display units comprises at least a pixel.]

[11. The three-dimensional printing apparatus of claim 10, wherein a size of each of the optical structures is an integer times a size of the pixel of the corresponding display unit.]

[12. The three-dimensional printing apparatus of claim 1, wherein each of the display units is aligned with some of the optical structures.]

[13. The three-dimensional printing apparatus of claim 12, wherein a size of each of the display units is an integer times a size of the corresponding optical structure.]

[14. The three-dimensional printing apparatus of claim 1, wherein each of the optical structures is a pyramidal prism or a triangular-shaped prism.]

[15. The three-dimensional printing apparatus of claim 1, wherein the light beams emitted from the display units are visible light.]

[16. The three-dimensional printing apparatus of claim 1, wherein the optical film may be a single layer film or a multilayer film.]

[17. A three-dimensional printing apparatus, comprising:

a container, containing a photosensitive material;

a display, having a plurality of display units, each of the display units being capable of emitting a light beam;

a control unit, connected to the display and controlling the display units of the display; and an optical film, disposed between the display and the container and projecting the light beams emitted from the display units onto the photosensitive material to form a plurality of projected patterns, wherein an arranging sequence and an arranging direction of the projected patterns are substantially the same as an arranging sequence and an arranging direction of the display units, and the projected patterns are formed as not overlapping, wherein the container has a bottom, disposed between the display and the photosensitive material, the bottom is a light-transparent bottom, the bottom of the container has an upper surface facing the photosensitive material, and a distance between the display and the upper surface of the container is less than or equal to 3 cm.]

*18. An optical assembly for a three-dimensional printing apparatus, comprising:*

*a container and a display, optically connected with each other, wherein*

*a plurality of display units are located in the display, and each of the display units is capable of emitting a light beam; and*

*the container is disposed above the display and comprises a light-transparent bottom being configured to accommodate a photosensitive material, wherein the light-transparent bottom of the container has an upper surface facing the photosensitive material;*

*wherein a distance between the display and an upper surface of the transparent bottom of the container is less than or equal to 3 cm.*

*19. The optical assembly of claim 18, wherein the optical assembly further comprises:*

*a control unit, connected to the display and controlling the display units of the display; and*

*an optical film, comprising a plurality of optical structures formed thereon and arranged in a direction perpendicular to a transmission direction of the light beams, wherein the optical film is disposed between the display and the container and projects the light beams emitted from the display units onto the photosensitive material to form a plurality of projected patterns,*

*wherein an arranging sequence and an arranging direction of the projected patterns are substantially the same as an arranging sequence and an arranging direction of the display units, and the three-dimensional printing apparatus does not have a projection lens,*

*wherein a dimension of each of the projected patterns is substantially equal to a dimension of each of the display units, so that the projected patterns are formed as not overlapping.*

*20. The optical assembly of claim 19, further comprising:*

*a work platform, dipped into the photosensitive material, capable of moving relatively with the container, wherein the work platform has a work surface;*

*wherein the work platform is controlled by the control unit, the control unit is programmed to command the display to display a first image during a first time and locates the work surface to a first location, the light beams emitted from the display units corresponding to the first image are projected onto a first layer of the photosensitive material between the work surface and the upper surface through the optical film, so as to cure the first layer of the photosensitive material to form a first cured layer, and the control unit commands the display to display a second image during a second time and locates the work surface to the second location, the light beams emitted from the display units corresponding to the second image are projected to a second layer of the photosensitive material between the first cured layer and the upper surface through the optical film, so*

*as to cure the second layer of the photosensitive material to form a second cured layer.*

*21. The optical assembly of claim 20, wherein the work surface faces the bottom, the second cured layer is located between the first cured layer and the bottom, and the first location is located between the bottom and the second location.*

*22. The optical assembly of claim 19, wherein the optical film comprises a plurality of optical structures, and each of the optical structures is aligned with at least one of the display units.*

*23. The optical assembly of claim 22, wherein an image of the display units is projected on the photosensitive material to form the projected patterns by the optical structures.*

*24. The optical assembly of claim 22, wherein each of the display units comprises at least a pixel.*

*25. The optical assembly of claim 24, wherein a size of each of the optical structures is an integer times a size of the pixel of the corresponding display unit.*

*26. The optical assembly of claim 19, wherein the optical film comprises a plurality of optical structures, and each of the display units is aligned with some of the optical structures.*

*27. The optical assembly of claim 26, wherein a size of each of the display units is an integer times a size of the corresponding optical structure.*

*28. The optical assembly of claim 19, wherein the optical film comprises a plurality of optical structures, and each of the optical structures is a lens, a cylindrical lens, a pyramidal prism or a triangular-shaped prism.*

*29. The optical assembly of claim 19, wherein the optical film is a Fresnel lens, diffusing film or a privacy filter.*

*30. The optical assembly of claim 18, wherein the light beams incident on a lower surface of a cured photosensitive material are substantially perpendicular to the lower surface of the cured photosensitive material.*

*31. A projection system for a three-dimensional printing apparatus, comprising:*

*a display, comprising a plurality of display units; and*

*a container disposed above the display and comprising a light-transparent bottom being configured to accommodate a photosensitive material, wherein the light-transparent bottom of the container has an upper surface facing the photosensitive material,*

*wherein each of the display units is capable of emitting light beams to the light-transparent bottom, and a distance between the display and of the upper surface of the transparent bottom of the container is less than or equal to 3 cm.*

*32. The projection system of claim 31, wherein the light beams incident on a lower surface of a cured photosensitive material are substantially perpendicular to the lower surface of the cured photosensitive material.*

*33. A container for a three-dimensional printing apparatus comprising a display and an optical film, comprising:*

*a light-transparent bottom, being configured to accommodate a photosensitive material, and the light-transparent bottom of the container has an upper surface facing the photosensitive material, wherein a display is disposed under the light-transparent bottom of the container and has a plurality of display units, each of the display units being capable of emitting light beams,*

*wherein a single layer optical film is disposed between the display and the light-transparent bottom of the container, and the single layer optical film comprises a plurality of optical structures formed thereon and is arranged in a direction perpendicular to a transmission direction of the light beams,*

*wherein the light beams emitted from each of the display units pass through the single layer optical film and subsequently pass through the light-transparent bottom in a substantially parallel manner to reach a lower surface of a cured photosensitive material.*

*34. The container of claim 33, wherein the single layer optical film projects the light beams emitted from the display units onto the photosensitive material to form a plurality of projected patterns.*

*35. The container of claim 34, wherein the projected patterns are formed as not overlapping.*

*36. The container of claim 34, wherein an arranging sequence and an arranging direction of the projected patterns are substantially the same as an arranging sequence and an arranging direction of the display units.*

* * * * *